No. 661,278. Patented Nov. 6, 1900.
M. L. ROBERTS.
PLOW.
(Application filed Aug. 14, 1900.)
(No Model.)
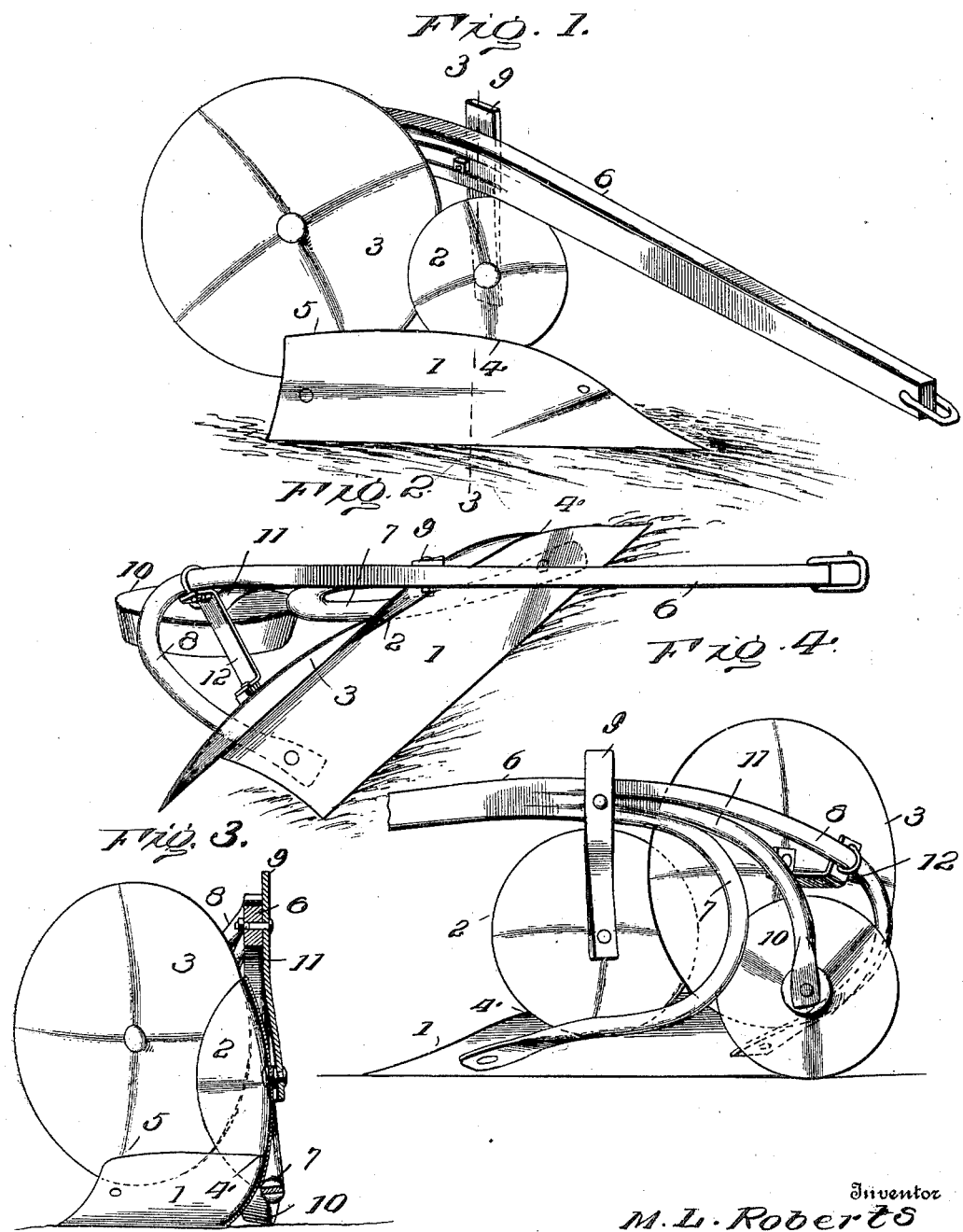
Witnesses
Inventor
M. L. Roberts

UNITED STATES PATENT OFFICE.

MATTHEW L. ROBERTS, OF WATERTOWN, SOUTH DAKOTA.

PLOW.

SPECIFICATION forming part of Letters Patent No. 661,278, dated November 6, 1900.

Application filed August 14, 1900. Serial No. 26,881. (No model.)

*To all whom it may concern:*

Be it known that I, MATTHEW L. ROBERTS, a citizen of the United States, residing at Watertown, in the county of Codington and State of South Dakota, have invented certain new and useful Improvements in Plows; and I do hereby declare the following to be a full, clear, and exact description of the invention, such as will enable others skilled in the art to which it appertains to make and use the same.

This invention aims to lessen the draft of a plow of given size and capacity and reduce the friction of the slice of earth upon the moldboard.

The invention consists of a share or lay and one or more concavo-convex disk cutters in combination therewith to cut the slice and turn the earth in the formation of the furrow.

For a full description of the invention and the merits thereof and also to acquire a knowledge of the details of construction of the means for effecting the result reference is to be had to the appended description and drawings hereto attached.

While the essential and characteristic features of the invention are necessarily susceptible of modification, still the preferred embodiment of the invention is illustrated in the accompanying drawings, in which—

Figure 1 is a perspective view of a plow embodying the invention. Fig. 2 is a top plan view. Fig. 3 is a cross-section on the line 3 3 of Fig. 1. Fig. 4 is an elevation of the plow viewed from the land side.

Corresponding and like parts are referred to in the following description and indicated in all the views of the drawings by the same reference characters.

The plow comprises the share or lay 1, front disk 2, and rear disk 3. The point of the share or lay projects forward of the disk 2 and is curved at its top edge, as shown at 4, the curved portion about in line with the top edge of the share conforming to and snugly fitting the concave face of the lower portion of the disk 2, so as to prevent the formation of any space between the contiguous parts of the share and forward disk. As a result of the close contact of the share with the concave face of the disk 2 the latter is kept clean and free from all dirt and matter tending to cling thereto, the share acting in the capacity of a scraper to the performance of this end. The lower edge of the share or lay is straight from toe to heel, and the share inclines rearwardly and outwardly in the direction of its length in the usual manner and curves inward slightly between its top and bottom edges. The upper rear portion of the share is made rounding, as shown at 5, so as to fit close against the concave face of the rear disk 3 for a purpose similar to the snug fit between the upper forward portion of the share and the disk 2. The share or lay may be connected with the beam 6 in any convenient way, and, as shown, standards 7 and 8 are secured at their lower ends to the corresponding parts of the share. The front standard 7 is in the plane of the beam 6 and curves downwardly and forwardly, whereas the rear standard 8 curves downwardly, laterally, and forwardly to receive the rear end of the share 1. These standards form branches of the beam, although they may be provided in any desired way.

The front disk 2 is considerably smaller than the rear disk 3, and its forward edge is about in the plane of the inner or top edge of the plow-point and acts in the capacity of a colter to cut grass, roots, and other growth. This disk is suitably supported and, as shown, is mounted upon a standard 9, clipped or otherwise adjustably attached at its upper end to the beam 6. The disk 2 inclines with reference to the line of motion of the implement to conform approximately to the set or horizontal inclination of the share or lay 1 and coöperates therewith to give the initial turn to the slice of earth when turning the furrow.

The rear disk 3 is of larger diameter than the disk 2 and performs the function of a moldboard in completing the turning of the slice of earth. This disk also inclines with reference to the line of motion of the implement and in conformity to the longitudinal inclination of the share 1. The front portion of the disk 3 underlaps the rear portion of the disk 2, so as not to offer any impediment to the free passage of the earth from the disk 2 thereon. The disks are mounted to rotate about horizontal axes, thereby obviating sliding friction between their concave faces and the earth passing thereover, and as a result the draft is materially diminished and the plow made easy-running.

The furrow-wheel 10 is inclined from the perpendicular away from the moldboard at its lower portion, and its rim or tread-surface is correspondingly inclined, so as to enable it to run squarely upon the bottom of the furrow. The furrow-wheel is located opposite the rear disk 3 and between the standards 7 and 8 and is journaled to the lower end of an intermediate standard 11, likewise forming a branch of the beam 6. The provision of a landside of ordinary construction is obviated by the elemental construction herein specified. Hence the resultant friction between the vertical wall of the furrow and the landside is obviated, and this is a material factor in reducing the draft and enabling the plow to run easier than implements of this character as heretofore commonly constructed. The rear disk 3 is journaled to an arm 12, clipped to the standard 8 in such a manner as to admit of its adjustment as may be required to secure the proper set and a close joint between its lower concave face and the upper portion of the share 1.

Having thus described the invention, what is claimed as new is—

1. In a plow, and in combination with a share, front and rear disks coöperating with the share, the forward portion of the rear disk underlapping the rear portion of the forward disk, substantially as set forth.

2. In a plow, and in combination with a share, front and rear disks of different diameters, the forward disk being the smaller and having its rear portion overlapping the front portion of the rear disk, substantially as set forth.

3. In combination with the share of a plow having its upper front and rear edge portions curved, front and rear disks having their lower concave faces snugly fitting the corresponding edge portions of the share, the rear disk being of larger diameter than the front disk and having its front portion underlapping the rear part of the front disk, substantially as set forth.

4. In a plow, front and rear standards connected at their upper ends to the beam, the front standard being about in the plane of said beam and the rear standard curving laterally, a share secured at its ends to the end portions of the said standards and having its upper front and rear edge portions curved, and front and rear concavo-convex disks overlapping and having the lower portion of their concave faces snugly fitting the corresponding curved edges of the said share, substantially as set forth.

5. In combination, a beam having a front, a rear and an intermediate standard branching therefrom, a share secured to the terminal portions of the front and rear standards, front and rear disks coöperating with the share in the manner set forth, and a furrow-wheel journaled to the lower end of the intermediate standard and located between the front and rear standards, substantially as specified.

In testimony whereof I affix my signature in presence of two witnesses.

MATTHEW L. ROBERTS. [L. S.]

Witnesses:
H. J. FAHNESTOCK,
JOHN FAHNESTOCK.